United States Patent
Zhang et al.

(10) Patent No.: US 9,948,856 B2
(45) Date of Patent: Apr. 17, 2018

(54) METHOD AND APPARATUS FOR ADJUSTING A PHOTO-TAKING DIRECTION, MOBILE TERMINAL

(71) Applicant: HISENSE MOBILE COMMUNICATIONS TECHNOLOGY CO., LTD., Qingdao (CN)

(72) Inventors: Jun Zhang, Qingdao (CN); Qing Mu, Qingdao (CN); Hui Sun, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 15/393,510

(22) Filed: Dec. 29, 2016

(65) Prior Publication Data

US 2017/0111575 A1    Apr. 20, 2017

(30) Foreign Application Priority Data

Jun. 23, 2016 (CN) .......................... 2016 1 0472057

(51) Int. Cl.
| | | |
|---|---|---|
| H04N 5/222 | (2006.01) | |
| H04N 5/232 | (2006.01) | |
| G06K 9/00 | (2006.01) | |
| G06K 9/32 | (2006.01) | |

(52) U.S. Cl.
CPC ..... *H04N 5/23222* (2013.01); *G06K 9/00255* (2013.01); *G06K 9/3208* (2013.01); *H04N 5/23293* (2013.01)

(58) Field of Classification Search
CPC .................. H04N 5/23222; G06K 9/3208
See application file for complete search history.

(56) References Cited

U.S. PATENT DOCUMENTS

| 9,774,780 B1* | 9/2017 | Baldwin ............ H04N 5/23222 |
| 2017/0256073 A1* | 9/2017 | Borenstein ................ G06T 7/73 |

* cited by examiner

*Primary Examiner* — Gary C Vieaux
(74) *Attorney, Agent, or Firm* — Harness, Dickey & Pierce, P.L.C.

(57) ABSTRACT

Disclosure includes a method and apparatus for adjusting a photo-taking direction, including: starting a back camera of a mobile terminal, and entering a photo-taking mode; determining that the mobile terminal is in a horizontal posture, and starting a front camera of the mobile terminal to obtain a human face image of a user; extracting a corresponding first feature point, a corresponding second feature point, and a corresponding third feature point respectively from a first human face organ, a second human face organ, and a third human face organ in the human face image; and determining whether an imaging direction of an image obtained by the back camera agrees with a target photo-taking direction of the back camera, and adjusting the imaging direction of the image obtained by the back camera to the target photo-taking direction of the back camera in the event that they do not agree with each other.

14 Claims, 14 Drawing Sheets

METHOD AND APPARATUS FOR ADJUSTING A PHOTO-TAKING DIRECTION, MOBILE TERMINAL

CROSS-REFERENCE TO RELATED APPLICATION

This application claims the benefit and priority of Chinese Patent Application No. 201610472057.0 filed Jun. 23, 2016. The entire disclosure of the above application is incorporated herein by reference.

FIELD

The present disclosure relates to the field of communications, and particularly to a method and apparatus for adjusting a photo-taking direction, and a mobile terminal.

BACKGROUND

This section provides background information related to the present disclosure which is not necessarily prior art.

Many existing terminals are provided with a photo-taking function, and as cameras and other pieces of hardware of the terminals are being improved constantly, there is a better and better effect of taking photos on the terminals, so that their users frequently take various photos using the photo-taking function of the terminals. For example, a mobile phone is a terminal with the photo-taking function, and a user thereof frequently takes various photos using the photo-taking function of the mobile phone.

SUMMARY

This section provides a general summary of the disclosure, and is not a comprehensive disclosure of its full scope or all of its features.

In an aspect, an embodiment of the disclosure provides a method for adjusting a photo-taking direction, the method including:

starting a back camera of a mobile terminal, and entering a photo-taking mode;

determining that the mobile terminal is in a horizontal posture, and starting a front camera of the mobile terminal to obtain a human face image of a user;

extracting a corresponding first feature point, a corresponding second feature point, and a corresponding third feature point respectively from a first human face organ, a second human face organ, and a third human face organ in the human face image; and determining a comparison relationship between coordinates of the first feature point, the second feature point, and the third feature point, determining whether an imaging direction of an image obtained by the back camera agrees with a target photo-taking direction of the back camera, according to the comparison relationship between the coordinates, and adjusting the imaging direction of the image obtained by the back camera to the target photo-taking direction of the back camera in the event that they do not agree with each other.

In another aspect, an embodiment of the disclosure provides an apparatus for adjusting a photo-taking direction, the apparatus including:

a memory configured to store at least one machine readable program code; and a processor configured to execute the at least one machine readable program code to perform:

starting a back camera of a mobile terminal, and entering a photo-taking mode;

determining that the mobile terminal is in a horizontal posture, and starting a front camera of the mobile terminal to obtain a human face image of a user;

extracting a corresponding first feature point, a corresponding second feature point, and a corresponding third feature point respectively from a first human face organ, a second human face organ, and a third human face organ in the human face image; and determining a comparison relationship between coordinates of the first feature point, the second feature point, and the third feature point, determining whether an imaging direction of an image obtained by the back camera agrees with a target photo-taking direction of the back camera, according to the comparison relationship between the coordinates, and adjusting the imaging direction of the image obtained by the back camera to the target photo-taking direction of the back camera in the event that they do not agree with each other.

In a further aspect, an embodiment of the disclosure provides a mobile terminal including a front camera, a back camera, a memory, and a processor, wherein:

the memory is configured to store at least one machine readable program code; and the processor is configured to execute the at least one machine readable program code to perform: starting a back camera of a mobile terminal, and entering a photo-taking mode; determining that the mobile terminal is in a horizontal posture, and starting a front camera of the mobile terminal to obtain a human face image of a user; extracting a corresponding first feature point, a corresponding second feature point, and a corresponding third feature point respectively from a first human face organ, a second human face organ, and a third human face organ in the human face image; and determining a comparison relationship between coordinates of the first feature point, the second feature point, and the third feature point, determining whether an imaging direction of an image obtained by the back camera agrees with a target photo-taking direction of the back camera, according to the comparison relationship between the coordinates, and adjusting the imaging direction of the image obtained by the back camera to the target photo-taking direction of the back camera in the event that they do not agree with each other.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1-9 is a schematic structural diagram of a mobile terminal according to some embodiments of the disclosure;

FIG. 2 is a flow chart of a method for adjusting a photo-taking direction according to some embodiments of the disclosure;

FIG. 3-1 is a diagram of a positional relationship between an object for which a photo is to be taken, and the terminal according to some embodiments of the disclosure;

FIG. 3-2 is a diagram of a positional relationship between an object for which the photo is to be taken, the terminal, and a user according to some embodiments of the disclosure;

FIG. 3-3 to FIG. 3-6 are schematic diagrams of obtaining a photo of a human face according to some embodiments of the disclosure;

FIG. 3-7 is a flow chart of processing in the step 205 illustrated in FIG. 2;

FIG. 3-8 and FIG. 3-9 are schematic diagrams of adjusting an imaging direction of an image obtained by a back camera to a target photo-taking picture of the back camera according to some embodiments of the disclosure;

FIG. 4 is a schematic structural diagram of an apparatus for adjusting a photo-taking direction according to some embodiments of the disclosure; and FIG. 5 is a schematic structural diagram of an apparatus for adjusting a photo-taking direction according to some embodiments of the disclosure.

Corresponding reference numerals indicate corresponding parts or features throughout the several views of the drawings.

DETAILED DESCRIPTION

Example embodiments will now be described more fully with reference to the accompanying drawings.

At present, a user typically places his or her mobile terminal in a horizontal posture in which the user holds the mobile terminal in his or her hand so that the mobile terminal remains horizontal or substantially horizontal. The mobile terminal can be a mobile phone, a tablet computer, a Personal Digital Assistant (PDA), or another mobile terminal device. For example, at present, the user typically takes a photo of such a document or another object for which a photo is to be taken that is placed horizontal or substantially horizontal using his or her mobile terminal device. For example, if the user is going to take a photo of a document placed on a table using his or her mobile phone, then the user holding the mobile phone in his or her hand will place the mobile phone horizontal or substantially horizontal, so that a back camera of the mobile phone can take a photo of the document placed horizontal or substantially horizontal.

Figure 1:
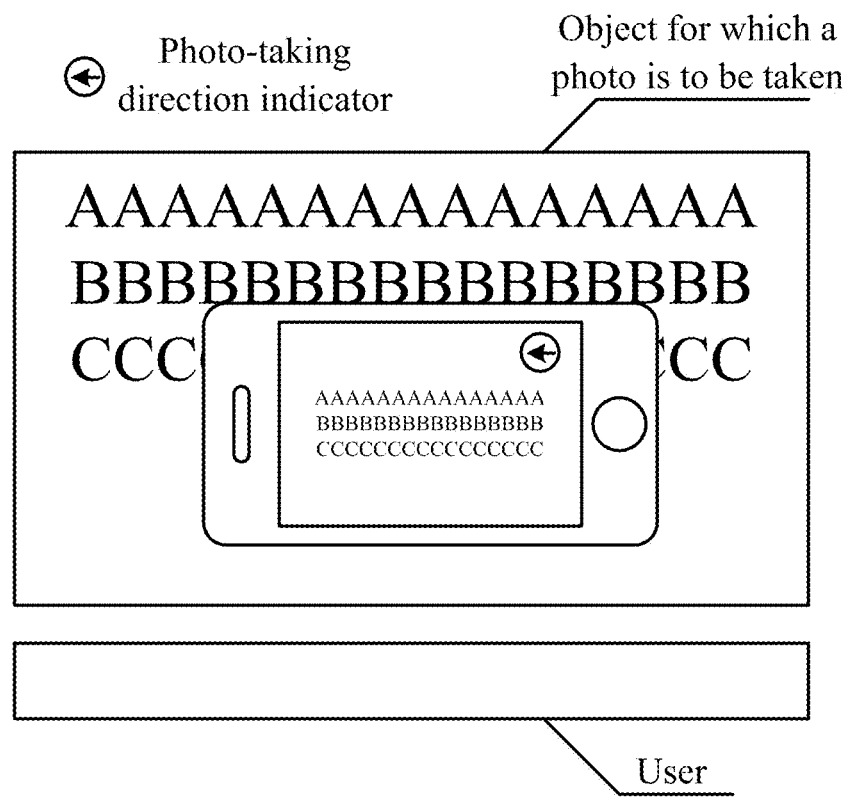
FIG. 1-1 to FIG. 1-8 are schematic diagrams of displaying a photo on a screen of a mobile terminal according to some embodiments of the disclosure.
Figures 1, 2:
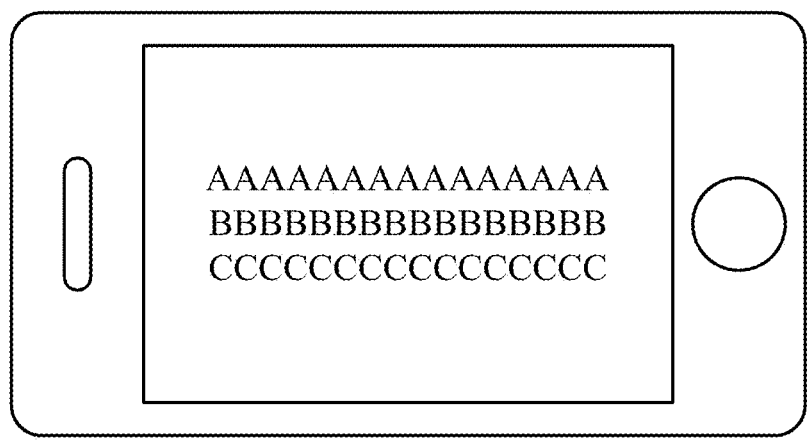

A photo-taking direction of the mobile terminal in the horizontal posture includes landscape and portrait directions. If the user is going to take a photo using the mobile terminal in the landscape direction, then the user will hold the mobile terminal in his or her hand in the landscape direction with the top and the bottom of the mobile terminal remaining horizontal, then the mobile terminal will detect the photo-taking direction as the landscape direction, so that the mobile terminal will take a photo in the landscape direction, and display the photo in the landscape direction after taking the photo. If the mobile terminal is held in the hand of the user in the landscape direction, then the user will hold the mobile terminal in his or her hand so that the mobile terminal is placed horizontal to the user himself or herself. For example, as illustrated in FIG. 1-1, the user places the mobile terminal parallel thereto, that is, the user holds the mobile terminal in his or her hand in the landscape direction with the top and the bottom of the mobile terminal remaining horizontal, so that the mobile terminal detects the photo-taking direction as the landscape direction indicated by a photo-taking direction indicator in a display interface as illustrated in FIG. 1-1; and the photo taken by the mobile terminal is taken in the landscape direction, and as illustrated in FIG. 1-2, the mobile terminal displays the photo in the landscape direction, that is, the final imaging direction of the photo is the landscape direction.

Figures 1, 2, 3:
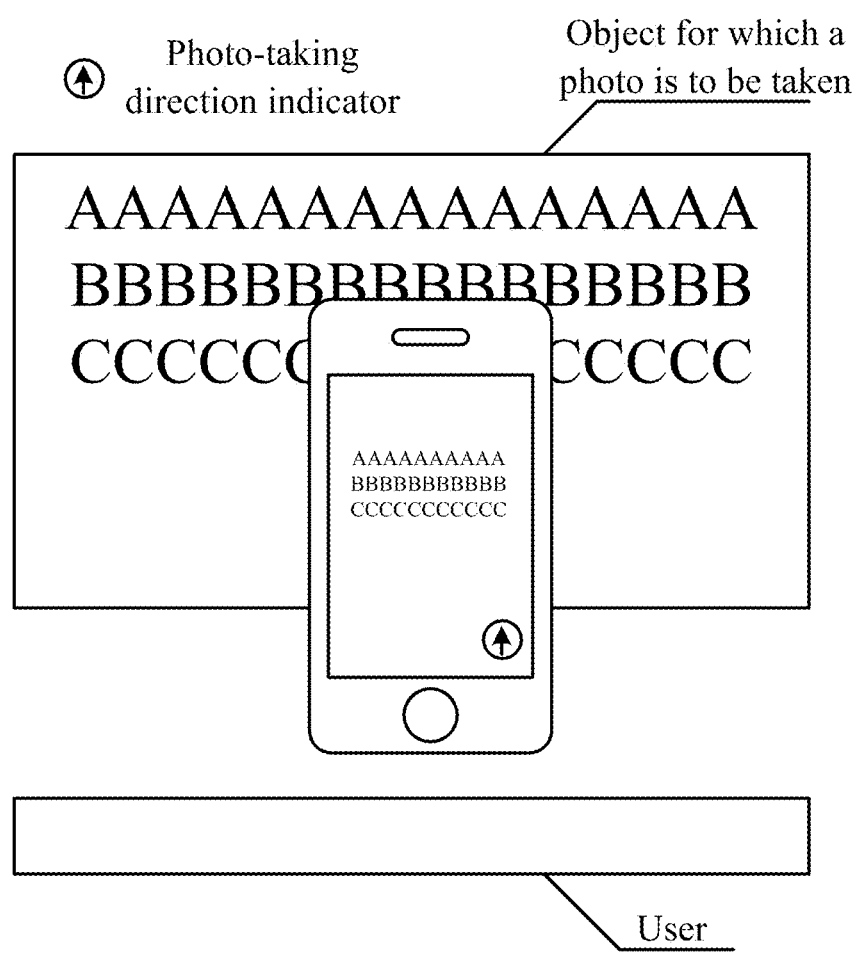

If the user is going to take a photo using the mobile terminal in the portrait direction, then the user will hold the mobile terminal in his or her hand in the portrait direction with both the left and right sides of the mobile terminal remaining horizontal, then the mobile terminal will detect the photo-taking direction as the portrait direction. A photo taken by the mobile terminal in the portrait direction is displayed in the portrait direction. If the mobile terminal is held in the hand of the user in the portrait direction, then the user will hold the mobile terminal in his or her hand so that the mobile terminal is placed perpendicular to the user himself or herself. For example, as illustrated in FIG. 1-3, the user places the mobile terminal perpendicular thereto, that is, the user holds the mobile terminal in his or her hand in the portrait direction with both the left and right sides of the mobile terminal remaining horizontal, so that the mobile terminal detects the photo-taking direction as the portrait direction indicated by a photo-taking direction indicator in a display interface as illustrated in FIG. 1-3; and the photo taken by the mobile terminal is taken in the portrait direction, and as illustrated in FIG. 1-4, the mobile terminal displays the photo in the portrait direction, that is, the final imaging direction of the photo is the portrait direction.

However the user taking a photo in the landscape direction (that is, the intended target photo-taking direction is the landscape direction) may not notice that the top of the mobile terminal is higher than the bottom thereof, so that the mobile terminal detects the photo-taking direction as the portrait direction. For example, as illustrated in FIG. 1-5, the mobile terminal detects the photo-taking direction as the portrait direction, and indicates the photo-taking direction as the portrait direction using the photo-taking direction indicator in the display interface, so that the mobile terminal takes a photo in the portrait direction, and displays the taken photo in the portrait direction, that is, the final imaging direction of the photo is the portrait direction, as illustrated in FIG. 1-6. In this case, the intended target photo-taking direction of the user does not agree with the photo-taking direction detected by the mobile terminal.

The user taking a photo in the portrait direction (that is, the intended target photo-taking direction is the portrait direction) may not notice that the left side of the mobile terminal is higher than the right side thereof, or the right side of the mobile terminal is higher than the left side thereof, so that the mobile terminal detects the photo-taking direction as the landscape direction. For example, as illustrated in FIG. 1-7, the mobile terminal detects the photo-taking direction as the landscape direction, and indicates the photo-taking direction as the landscape direction using the photo-taking direction indicator in the display interface, so that the mobile terminal takes a photo in the landscape direction, and displays the taken photo in the landscape direction, that is, the final imaging direction of the photo is the landscape direction, as illustrated in FIG. 1-8. In this case, the intended target photo-taking direction of the user does not agree with the photo-taking direction detected by the mobile terminal.

In order to enable the mobile terminal to take a photo in the intended target photo-taking direction of the user, in any one of the following embodiments of the disclosure, it can be determined whether the imaging direction of the image of the photo taken by the mobile terminal in the horizontal posture agrees with the intended target photo-taking direction of the user, and if not, then the imaging direction of the image of the mobile terminal will be adjusted to the intended target photo-taking direction of the user.

As illustrated in FIG. 1-9, an embodiment of the disclosure provides a mobile terminal 100 including at least a camera 101, and a processor 102 including one or more processing cores, where the camera 101 includes a front camera and a back camera (not illustrated).

It shall be noted that the mobile terminal 100 can further include other components in addition to the two components above. For example, the mobile terminal 100 can further include a memory 103, an input unit 104, a display unit 105, a sensor 106, an audio circuit 107, a Wireless Fidelity (WiFi) module 108, a transceiver 109, and other components, and the memory 103 includes one or more computer readable storage mediums. It shall be noted that those skilled in the art can appreciate that the terminal 100 will not be limited to the structure of the terminal illustrated in FIG. 1-9, but can include more or less components than those as illustrated, or some of the components can be combined, or different components can be arranged.

The transceiver 109 can be configured to receive and transmit a signal in receiving and transmitting information or in communication, and particularly to receive and then pass downlink information of a base station to the one or more processors 102 for processing; and to send uplink data to the base station. Typically the transceiver 109 includes but will not be limited to an antenna, at least one amplifier, a tuner, one or more oscillators, a Subscriber Identifier Module (SIM) card, a transceiver device, a coupler, a Low Noise Amplifier (LNA), a duplexer, etc. Moreover the transceiver 109 can further communicate wirelessly with a network and another device in any one of communication standards or protocols including but not limited to a Global System of Mobile communication (GSM), a General Packet Radio Service (GPRS), a Code Division Multiple Access (CDMA), a Wideband Code Division Multiple Access (WCDMA), a Long Term Evolution (LTE), an e-mail, a Short Messaging Service (SMS), etc.

The memory 103 can be further configured to store software programs and modules, i.e., at least one machine readable program codes, and the processor 102 can be configured to execute the at least one machine readable program codes stored in the memory 103 to thereby perform various function applications and data processing. The memory 103 can generally include a program storage area and a data storage area, where an operating system, applications required for at least one function (e.g., an audio playing function, an image playing function, etc.), etc., can be stored in the program storage area; and data created for use of the mobile terminal 100 (e.g., audio data, an address book, etc.), etc., can be stored in the data storage area. Moreover the memory 103 can include a high-speed random access memory, and can further include a nonvolatile memory, e.g., at least one magnetic disks memory device, a flash memory device or another volatile solid memory device. Correspondingly the memory 103 can further include a memory controller configured to provide an access of the processor 102 and the input unit 104 to the memory 103.

The input unit 104 can be configured to receive input digital or character information, and to generate a keyboard, mouse, joystick, optical or track ball signal input related to user setting and function control. Particularly the input unit 104 can include a touch sensitive surface 141 and other input devices 142. The touch surface 141, also referred to as a touch display screen or a touch control panel, can collect a touch operation by a user thereon or in proximity thereto (e.g., an operation by the user using a finger, a touch pen or any other appropriate object or attachment on or in proximity to the touch sensitive surface 141) and drive a corresponding connected device by a preset program. Optionally the touch sensitive surface 141 can include two components of a touch detection device and a touch controller, where the touch detection device detects the position of touching by the user, and detects a signal as a result of the touch operation and transfers the signal to the touch controller; and the touch controller receives the touch signal from the touch detection device, and converts it into coordinates of a touch point and further transfers them to the processor, and can receive and execute a command sent by the processor 102. Moreover the touch sensitive surface 141 can be embodied in various types of resistive, capacitive, infrared, surface sound wave and other types. The input device 104 can further include another input device 142 in addition to the touch sensitive surface 141. Particularly the other input device 142 can include but will not be limited to one or more of a physical keyboard, functional keys (e.g., volume control buttons, a power button, etc.), a track ball, a mouse, a joystick, etc.

The display unit 105 can be configured to display a photo display interface, a camera presetting interface, information entered by the user or information provided to the user, and various graphic user interfaces of the mobile terminal 100, where these graphic user interfaces can be composed of graphics, texts, icons, videos or any combination thereof. The display unit 105 can include a display panel 151, and optionally the display panel can be configured in the form of a Liquid Crystal Display (LCD), an Organic Light-Emitting Diode (OLED) display, etc. Furthermore the touch sensitive surface 141 can overlie the display panel 151, and the touch sensitive surface 141 detecting the touch operation thereon or in proximity thereto transfers it to the processor 102 to determine the type of the touch event, and thereafter the processor 102 provides a corresponding visual output on the display panel 151 according to the type of the touch event. Although the touch sensitive surface 141 and the display panel 151 are embodied in FIG. 1-9 as two separate components to perform the input and output functions, the touch sensitive surface 414 and the display panel 151 can be integrated to perform the input and output functions in some embodiments.

The mobile terminal 100 can further include at least one sensor 106, e.g., an optical sensor, a motion sensor, and other sensors. Particularly the optical sensor can include an ambient optical sensor and a proximity sensor, where the ambient optical sensor can adjust the brightness of the display panel 151 according to the illumination of ambient light rays, and the proximity sensor can disable the display panel 151 and/or a backlight when the mobile terminal 100 moves in proximity to an ear. A gravity acceleration sensor which is a motion sensor can detect the magnitudes of accelerations in respective directions (typically three axes), and can detect the magnitude and the direction of gravity when the sensor is stationary and can be configured to perform applications of identifying the posture of a handset (e.g., switching between landscape and portrait modes, relevant games, calibration of the posture of a magnetometer, etc.), a relevant function of identifying vibration (e.g., a pedometer, a knock, etc.), etc.; and the mobile terminal 100 can be further configured with a gyroscope, a barometer, a hygrometer, a thermometer, an infrared sensor and other sensors, although a repeated description of these components will be omitted here.

The audio circuit 107 includes a speaker 171 and an audio transducer 172, both of which can provide an audio interface between the user and the mobile terminal 100. The audio circuit 107 can receive and convert audio data into an electric signal and transmit the electric signal to the speaker 171, which is converted by the speaker 171 into an audio signal for output; and on the other hand, the audio transducer 172 converts a collected audio signal into an electric signal which is received by the audio circuit 107 and then converted into audio data, and the audio data is further output to the processor 102 for processing and then transmitted by the transceiver 109 to another terminal, for example, or the audio data is output to the memory 103 for further processing. The audio circuit 107 may further include an earphone jack for communication between an external earphone and the terminal 100.

The WiFi is a technology of short-range wireless transmission, and the mobile terminal 100 can assist the user in transmitting and receiving an email, browsing a webpage, accessing streaming media, etc., through the WiFi module 108, and provide the user with a wireless broadband access to the Internet. Although the WiFi module 108 is illustrated in FIG. 1 to FIG. 9, it can be appreciated that it may not necessarily be required for the mobile terminal 100, but can be omitted as needed without departing from the spirit of the disclosure.

The processor 102 is a control center of the mobile terminal 100, has the respective components thereof connected by various interfaces and lines, and runs or executes the software programs and/or modules stored in the memory 103 and invokes the data stored in the memory 103 to perform the various functions of the terminal 100 and process the data to thereby manage and control the mobile device 100 as a whole. Optionally the processor 102 can be integrated with an application processor and a modem processor, where the application processor generally handles the operating system, the user interfaces, the applications, etc., and the modem processor generally handles wireless communication. As can be appreciated, the modem processor may not be integrated into the processor 102.

The mobile terminal 100 further includes a power source 109 (e.g., a battery) powering the respective components, and preferably the power source 109 can be logically connected with the processor 102 through a power management system to thereby perform charging and discharging management, power consumption management, and other functions through the power management system. The power source 109 can further include one or more DC or AC power sources, recharging systems, power source failure detection circuits, power source transformers or inverters, power source status indicators, and other any appropriate components.

Although not illustrated, the mobile terminal 100 can further include a Bluetooth module, etc., although a repeated description thereof will be omitted here. Particularly in this embodiment, the display unit of the terminal is a touch screen display.

It shall be noted that the processor 102 is configured to execute the at least one machine readable program code stored in the memory 103 to perform:

Starting the back camera of the mobile terminal, and entering a photo-taking mode;

Determining that the mobile terminal is in a horizontal posture, and starting a front camera of the mobile terminal to obtain a human face image of the user;

Extracting a first feature point, a second feature point, and a third feature point respectively corresponding to a first human face organ, a second human face organ, and a third human face organ in the human face image, where the first human face organ and the second human face organ are the left and right eyes respectively, or the first human face organ and the second human face organ are the left and right eyebrows respectively; and the third human face organ is the nose or the mouth; and Determining whether the imaging direction of the image obtained by the back camera agrees with the target photo-taking direction of the back camera according to a comparison relationship between coordinates of the first feature point, the second feature point, and the third feature point, and if not, then adjusting the imaging direction of the image obtained by the back camera to the target photo-taking direction of the back camera.

A method for adjusting a photo-taking direction, applicable to the mobile terminal illustrated in FIG. 1 will be described. As illustrated in FIG. 2, an embodiment of the disclosure provides a method for adjusting a photo-taking direction, applicable to the mobile terminal 100 illustrated in FIG. 1, where the method includes the following step:

The step 201 is to start the back camera of the mobile terminal, and to enter a photo-taking mode.

The step 202 is to determine that the mobile terminal is in a horizontal posture, and to start a front camera of the mobile terminal to obtain a human face image of the user.

Particularly the step 202 can include: obtaining posture information of the mobile terminal, obtaining the angle between the mobile terminal and the horizontal plane according to the posture information, and if the angle is below a preset threshold, then determining that the mobile terminal operates in the horizontal posture photo-taking mode;

In this embodiment, if the user needs to take a photo of such an object for which a photo is to be taken that is placed horizontal or substantially horizontal, using the mobile terminal, then the mobile terminal will be held in the hand of the user so that the mobile terminal is placed horizontal or substantially horizontal, and the back camera of the terminal will be started, so that the mobile terminal in the horizontal posture takes a photo of the object for which a photo is to be taken, where the object for which a photo is to be taken can be a document, etc. For example, a document 1 as illustrated in FIG. 3-1 is placed horizontal or substantially horizontal on a table, and the user holds the mobile terminal 2 in his or her hand, and places the mobile terminal 2 horizontal or substantially horizontal above the document 1, and then starts the back camera of the mobile terminal 2.

This step can include: obtaining posture information of the mobile terminal; determining the angle between the mobile terminal and the horizontal plane according to the posture information, and if the angle is below a preset threshold, then determining that the mobile terminal operates in the landscape photo-taking mode.

Here the mobile terminal includes a Global Positioning System (GPS) module, an accelerator sensor, a gravity sensor, a gyroscope, or another device. Optionally the posture information of the mobile terminal can be acquired through the GPS module, the accelerator sensor, the gravity sensor, the gyroscope, or the other device included in the mobile terminal.

Optionally the preset threshold can be 1 degree, 2 degrees, 3 degrees, or another value, although this embodiment will not be limited to any particular value of the preset threshold.

In this embodiment, the mobile terminal includes the front camera and the back camera, where the front camera is installed on the front side of the mobile terminal, and the front side is the side where the screen of the mobile terminal is located; and the back camera is installed on the back side of the mobile terminal, and the back side is the side opposite to the front side of the mobile terminal.

While the user holding the mobile terminal in his or her hand is taking a photo, the eyes of the user is looking at the screen of the mobile terminal, so that the human face of the user, the mobile terminal, and the object for which a photo is to be taken lie on the same vertical straight line, so the front camera of the mobile terminal can be started to exactly take a photo of the human face of the user. For example, as illustrated in FIG. 3-2, the human face 3 of the user is placed above the mobile terminal 2, and the document 1 for which a photo is to be taken is located below the mobile terminal 2, so that the human face 3 of the user, the mobile terminal 2, and the document 1 lie on the same vertical straight line, so the front camera of the mobile terminal 2 can take a photo of the human face 3 of the user.

The step 203 is to extract a corresponding first feature point, a corresponding second feature point, and a corresponding third feature point respectively from a first human face organ, a second human face organ, and a third human face organ in the human face image;

Here the first feature point, the second feature point, and the third feature point are located respectively on the first human face organ, the second human face organ, and the third human face organ, and the first human face organ and the second human face organ are the left and right eyes respectively, or the first human face organ and the second human face organ are the left and right eyebrows respectively; and the third human face organ is located between the first human face organ and the second human face organ, for example, the third human face organ can be the nose or the mouth.

The first feature point can be any point on the first human face organ, and optionally the first feature point can be a central point on the first human face organ. The second feature point can be any point on the second human face organ, and optionally the second feature point can be a central point on the second human face organ. The third feature point can be any point on the third human face organ, and optionally the third feature point can be a central point on the third human face organ. Optionally if the third human face organ is the nose, then the third feature point may be the tip of the nose.

The step 203 can be performed in the following sub-steps:

The sub-step 2031 is to determine a first contour image of the first human face organ, a second contour image of the second human face organ, and a third contour image of the third human face organ from the human face image in a human face recognition algorithm.

Figures 1, 2, 3, 4:
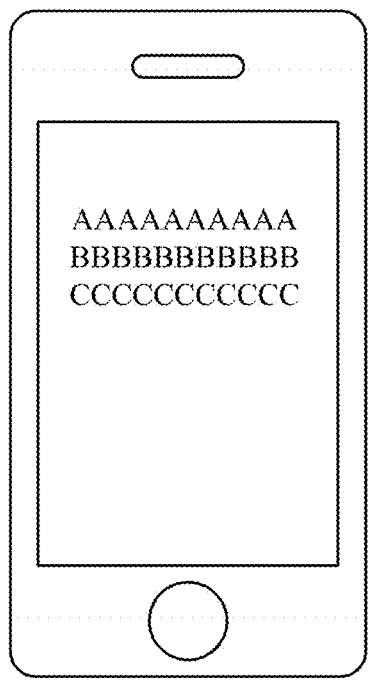

For example, as illustrated in FIG. 3-3 or FIG. 3-4, the front camera of the mobile terminal can take a photo of the human face, and the first human face organ, the second human face organ, and the third human face organ need to be recognized in FIG. 3-3 as the left eye, the right eye, and the mouth; and then the first contour image of the left eye, the second contour image of the right eye, and the third contour image of the mouth can be recognized from the human image in the preset human face recognition algorithm.

The sub-step 2032 is to extract the first feature point, the second feature point, and the third feature point respectively from the first contour image, the second contour image, and the third contour image.

Here the first feature point, the second feature point, and the third feature point have their corresponding coordinates respectively in a coordinate system on the screen of the mobile terminal. It shall be noted that the mobile terminal taking a photo creates a coordinate system on the screen thereof, and if the mobile terminal is placed parallel to the user, and detects the photo-taking direction as the landscape direction, then the mobile terminal will determine the top-left corner of the screen thereof as the origin of the coordinate system with the axis x parallel to the user, and the y axis perpendicular to the user. For example, as illustrated in FIG. 3-3, the user holds the mobile terminal in his or her hand in the landscape direction, and the mobile terminal detects the photo-taking direction also as the landscape direction (the photo-taking direction of the mobile terminal can be detected as the landscape direction or the portrait direction as in the prior art), where the photo-taking direction is indicated by the photo-taking direction indicator displayed on the screen of the mobile terminal as the landscape direction, and the arrow in the photo-taking direction indicator points to the top of the mobile terminal; and the mobile terminal creates the coordinate system on the screen thereof with the left-top corner Q1 of the screen of the mobile terminal being as the origin of the coordinate system with the x axis parallel to the user, and the y axis perpendicular to the user.

If the user holds the mobile terminal vertical in his or her hand, and the mobile terminal detects the photo-taking direction as the portrait direction, then the mobile terminal will determine the top-left corner of the screen thereof as the origin of the coordinate system with the axis x parallel to the user, and the y axis perpendicular to the user. For example, as illustrated in FIG. 3-4, the user holds the mobile terminal in his or her hand in the portrait direction, and the mobile terminal detects the photo-taking direction also as the portrait direction, where the photo-taking direction is indicated by the photo-taking direction indicator displayed on the screen of the mobile terminal as the portrait direction, and the arrow in the photo-taking direction indicator points to the top of the mobile terminal; and the mobile terminal creates the coordinate system on the screen thereof with the left-top corner Q1 of the screen of the mobile terminal being as the origin of the coordinate system with the x axis parallel to the user, and the y axis perpendicular to the user.

For example, if the user is holding the mobile terminal in his or her hand in the landscape direction, as illustrated in FIG. 3-3, then in this step, the first feature A1 with the coordinates (5, 5) will be extracted from the first contour image of the left eye; the second feature point B1 with the coordinates (10, 5) will be extracted from the second contour image of the right eye; and the third feature point C1 with the coordinates (7, 20) will be extracted from the third contour image of the mouth.

Figures 1, 2, 3, 4, 5:
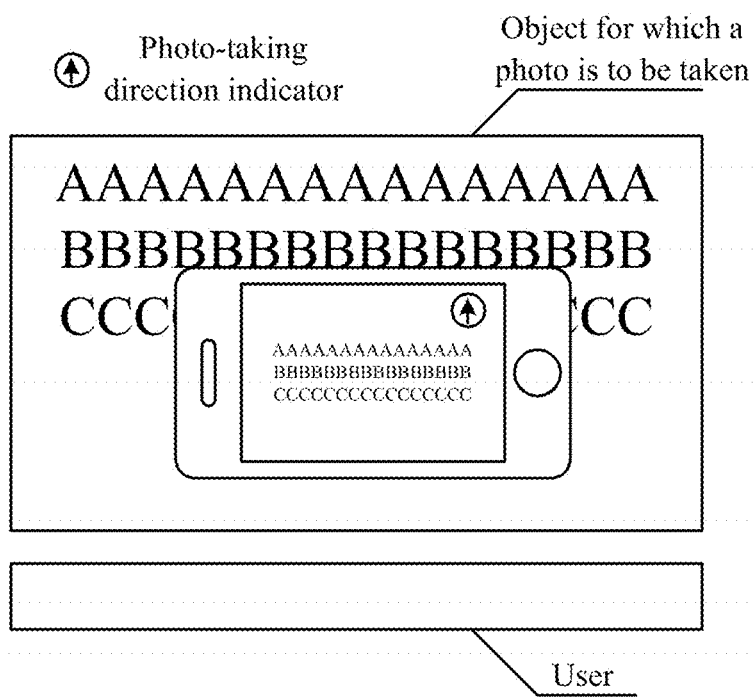
Figures 1, 2, 3, 4, 5, 6:
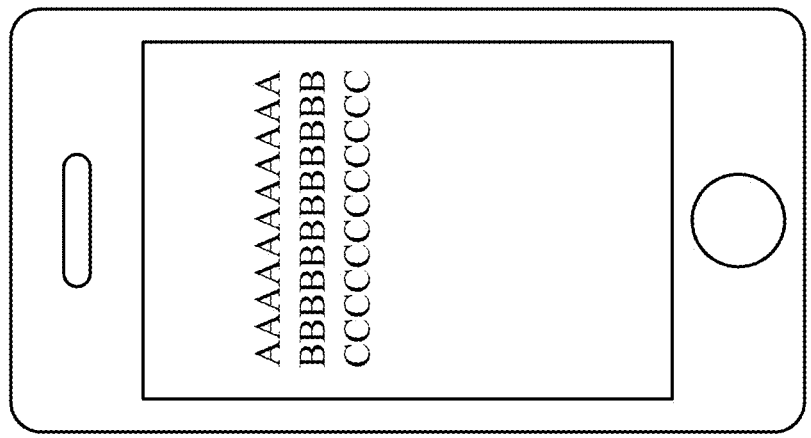
Figures 1, 2, 3, 4, 5, 6, 7:
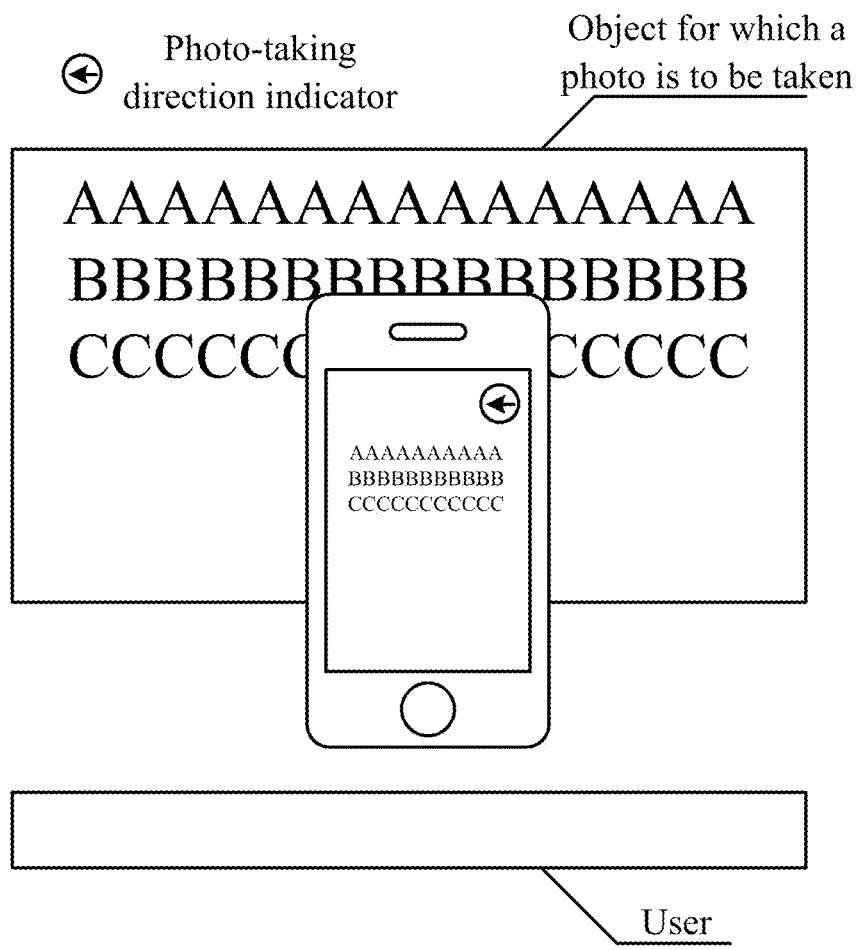
Figures 1, 2, 3, 4, 5, 6, 7, 8:
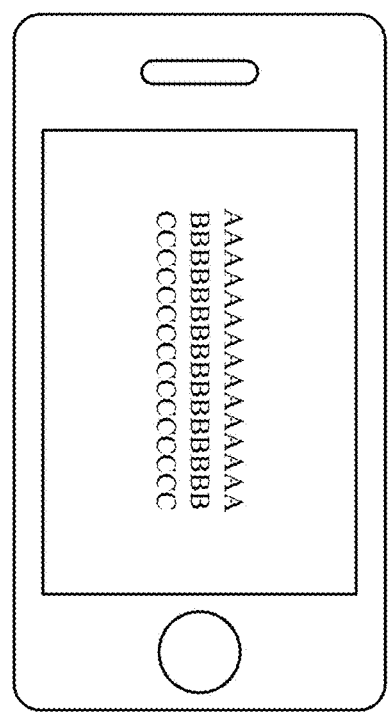
Figures 1, 2, 3, 4, 5, 6, 7, 8, 9:
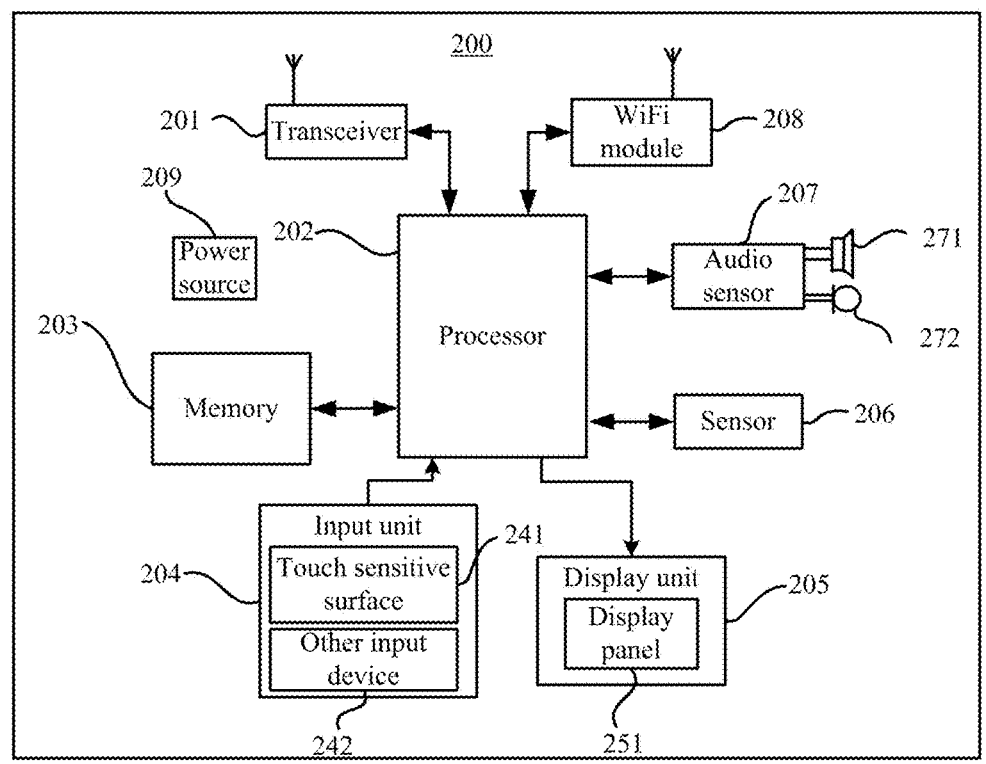
Figure 2:
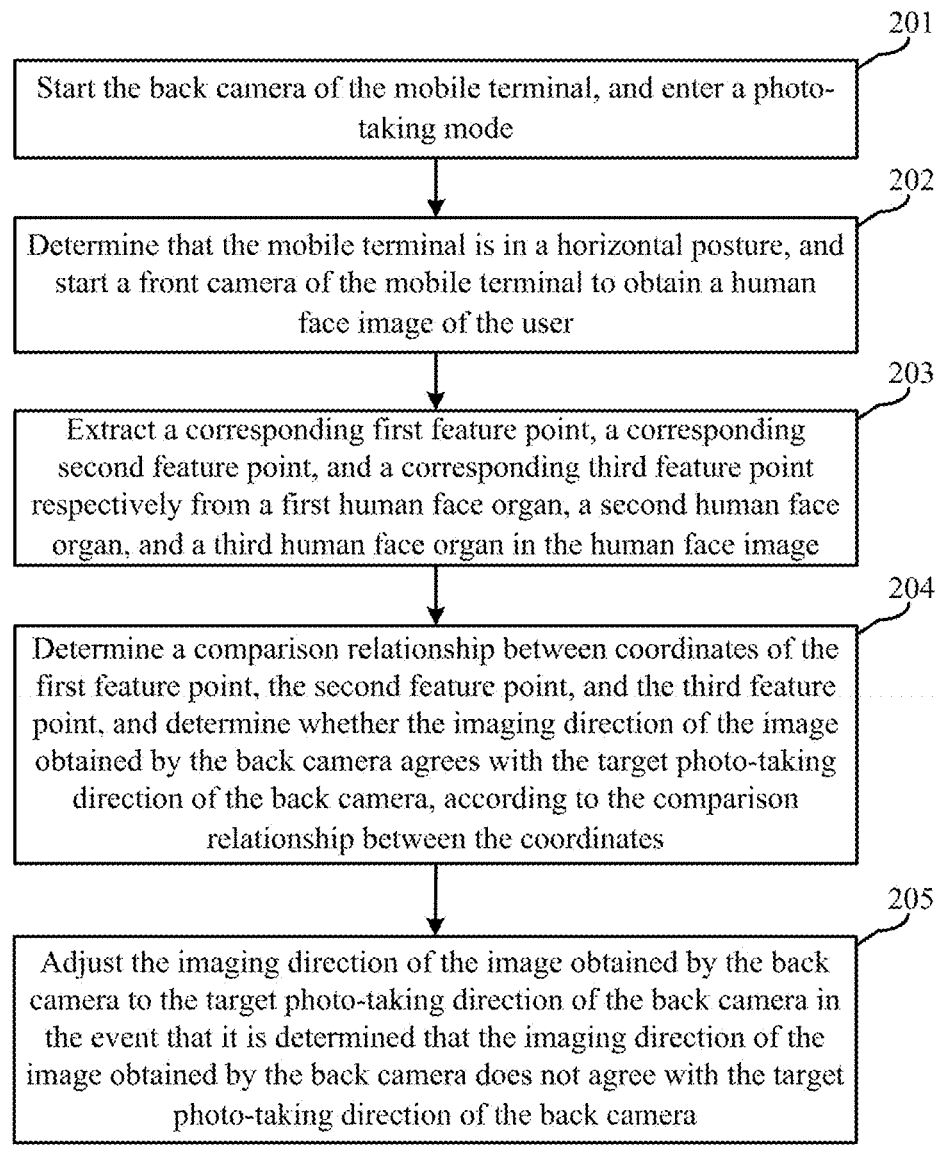
Figures 1, 3:
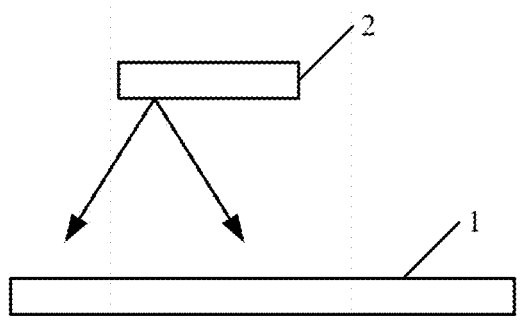
Figures 2, 3:
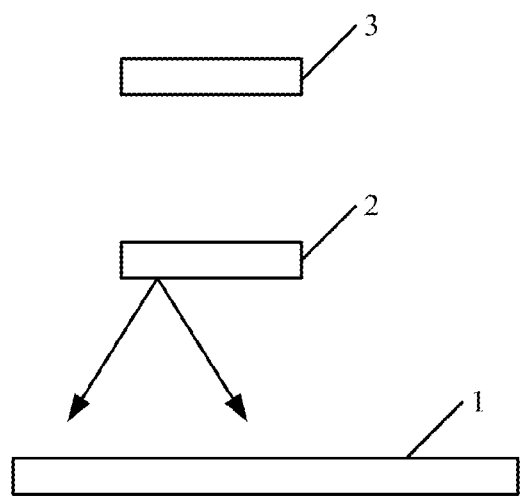
Figure 3:
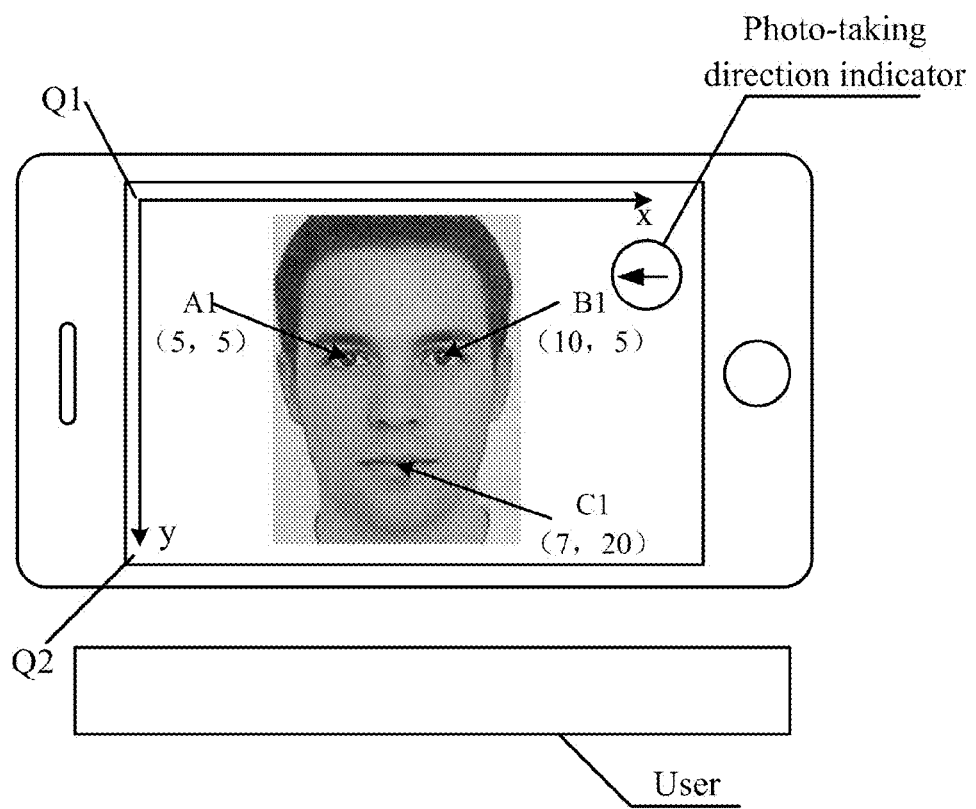
Figures 3, 4:
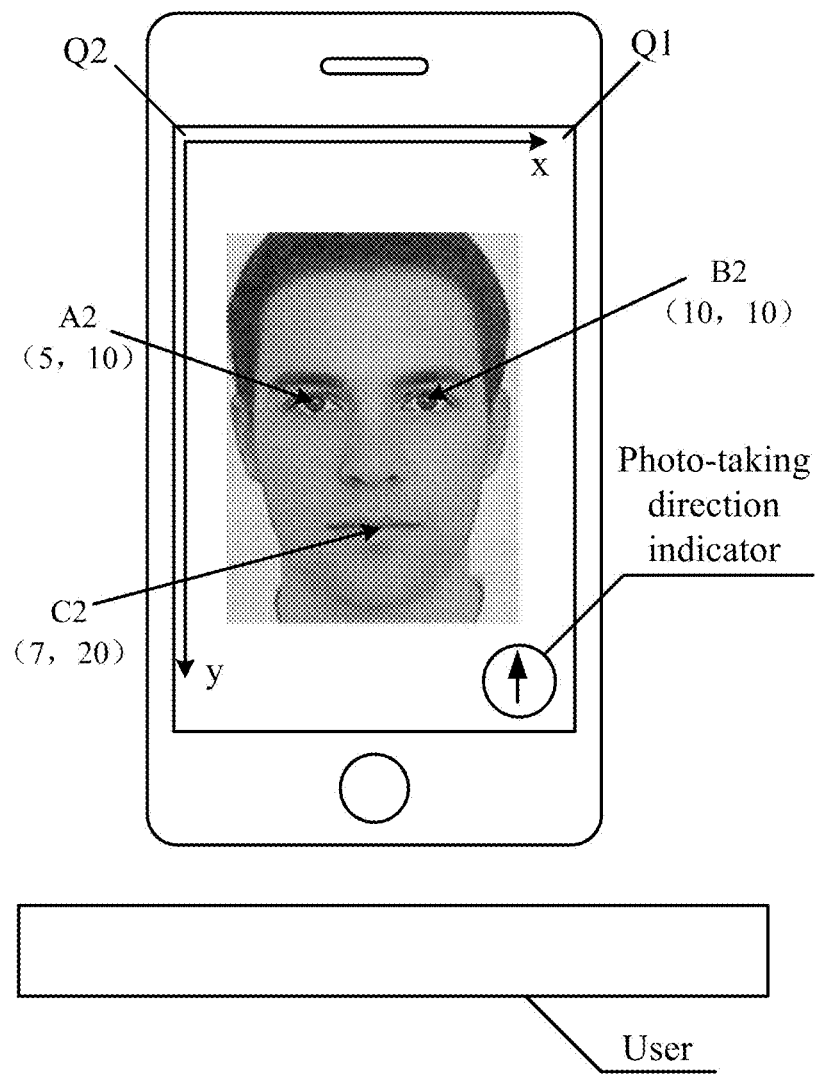
Figures 3, 4, 5:
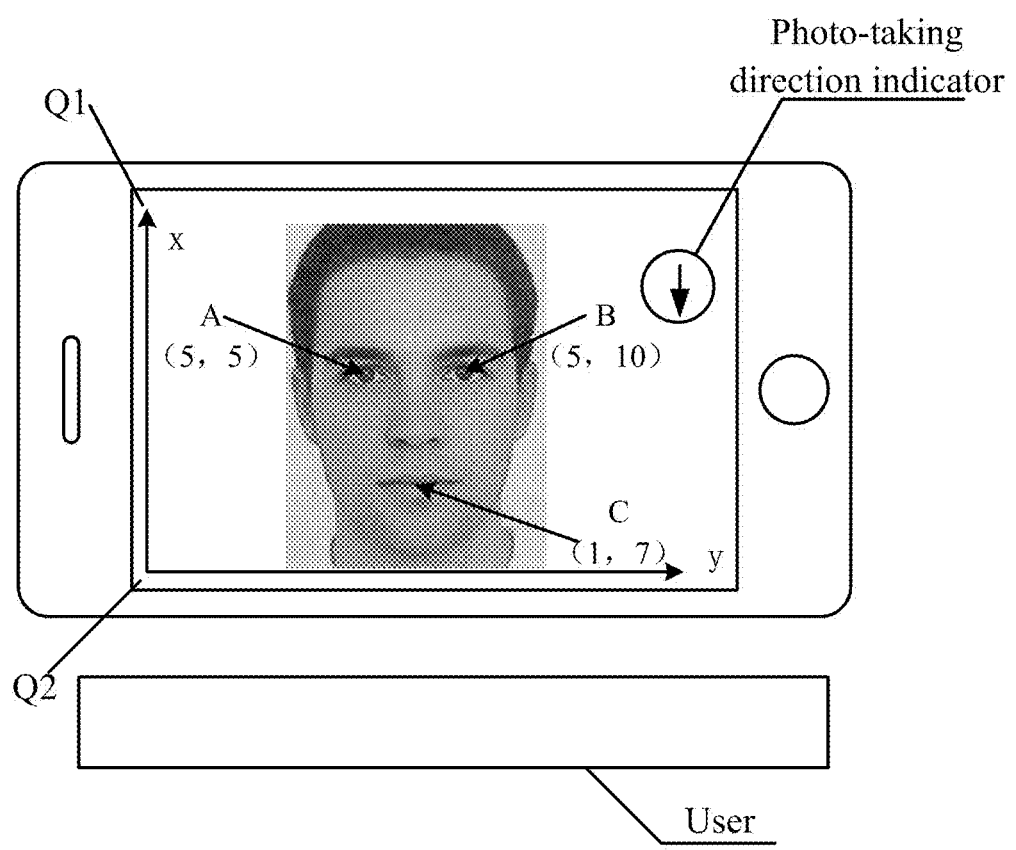
Figures 3, 4, 5, 6:
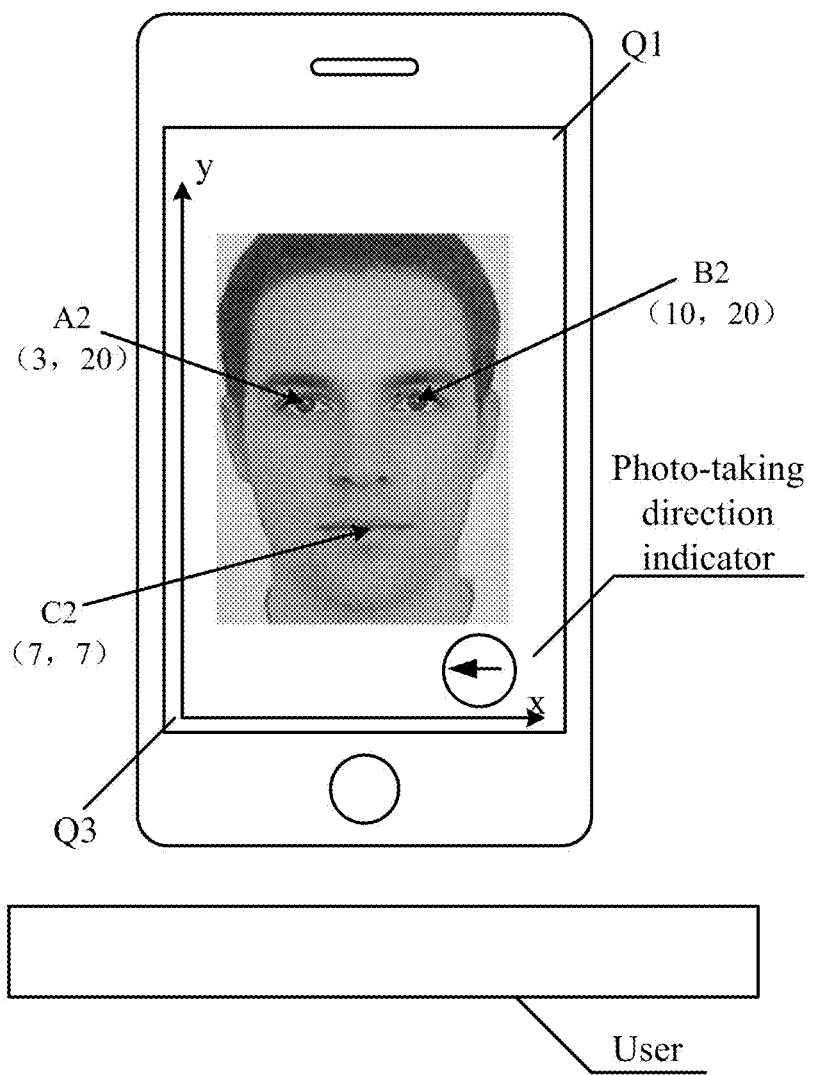
Figures 3, 4, 5, 6, 7:
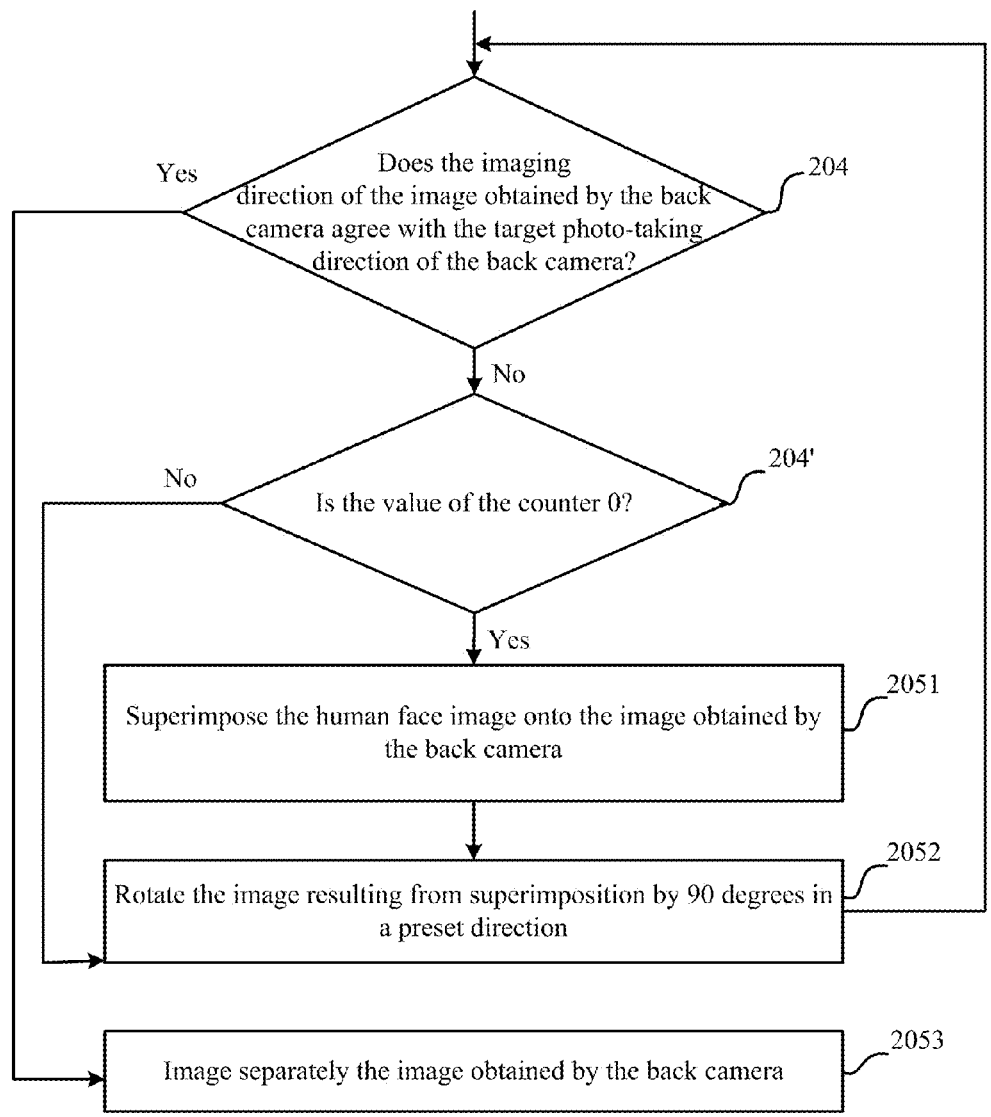
Figures 3, 4, 5, 6, 7, 8:
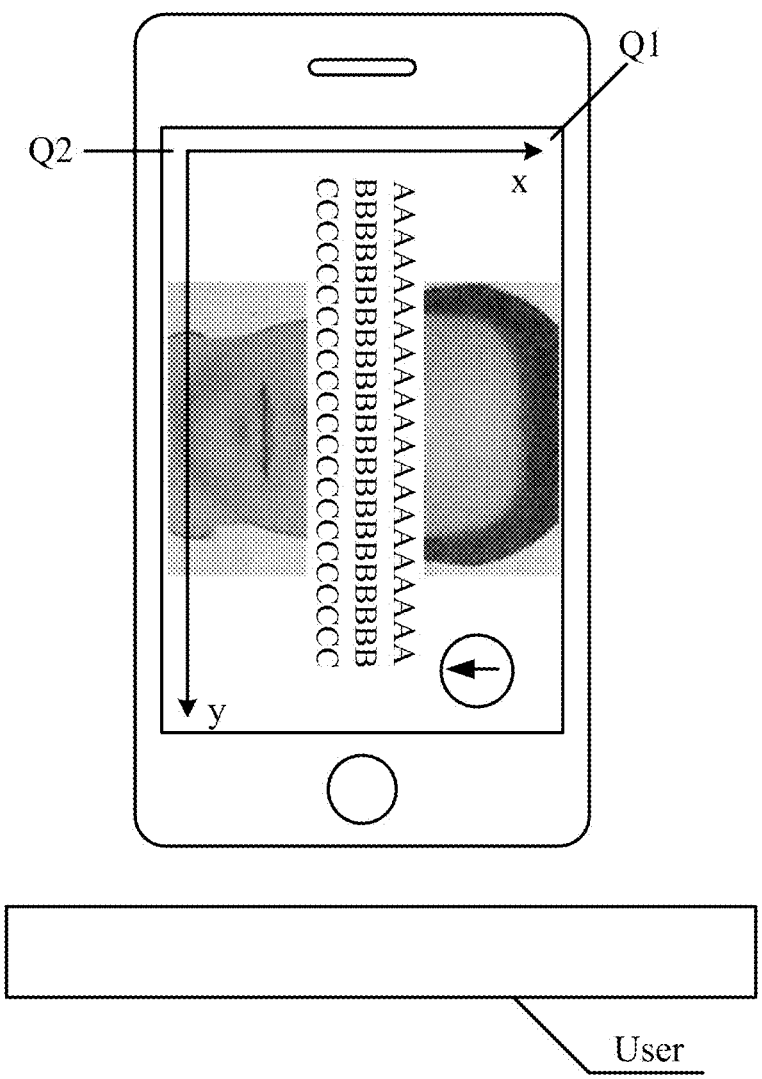
Figures 3, 4, 5, 6, 7, 8, 9:
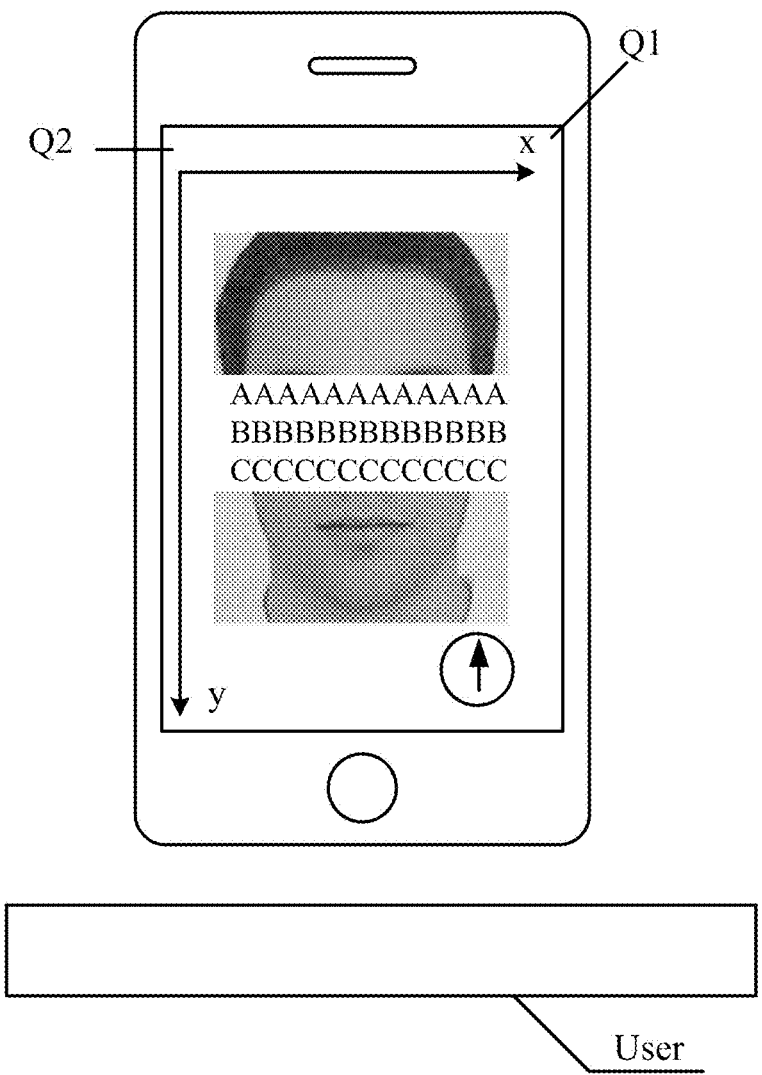
Figure 4:
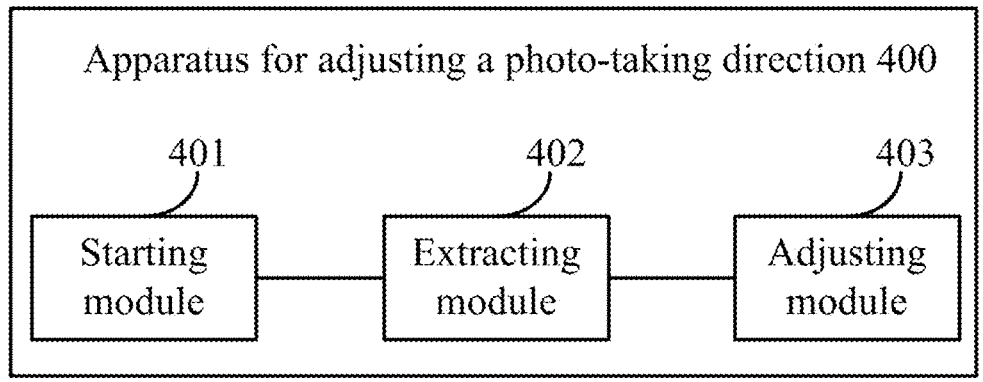
Figure 5:
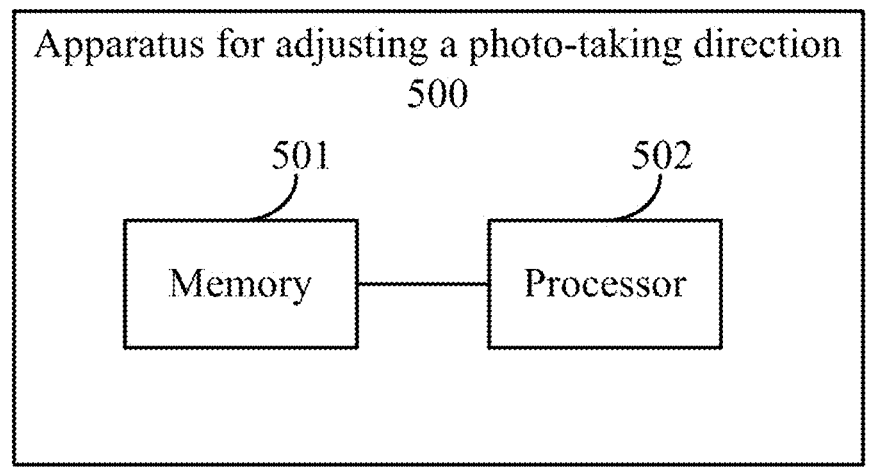

In another example, if the user is holding the mobile terminal in his or her hand in the portrait direction, as illustrated in FIG. 3-5, then in this step, the first feature A2 with the coordinates (5, 5) will be extracted from the first contour image of the left eye; the second feature point B2 with the coordinates (10, 5) will be extracted from the second contour image of the right eye; and the third feature point C2 with the coordinates (7, 20) will be extracted from the third contour image of the mouth.

The step 204 is to determine a comparison relationship between coordinates of the first feature point, the second feature point, and the third feature point, and to determine whether the imaging direction of the image obtained by the back camera agrees with the target photo-taking direction of the back camera, according to the comparison relationship between the coordinates.

Here the coordinates of the first feature point are represented as (x1, y1), the coordinates of the second feature point are represented as (x2, y2), and the coordinates of the third feature point are represented as (x3, y3).

Optionally this step can be performed in the following sub-steps 2041 to 2045:

The sub-step 2041 is to calculate the first difference $\Delta_1=x_2-x_1$ between the abscissa of the second feature point, and the abscissa of the first feature point;

The sub-step 2042 is to calculate the second difference $\Delta_2=y_2-y_1$ between the ordinate of the second feature point, and the ordinate of the first feature point;

The sub-step 2043 is to calculate the third difference $\Delta_3=y_3-y_2$ between the ordinate of the third feature point, and the ordinate of the second feature point;

The sub-step 2044 is to calculate the fourth difference $\Delta_4=x_2-x_3$ between the abscissa of the second feature point, and the abscissa of the third feature point;

For example, in the example as illustrated in FIG. 3-2, the first difference $\Delta_1$ is calculated as 5, the second difference $\Delta_2$ is calculated as 0, the third difference $\Delta_3$ is calculated as 15, and the fourth difference $\Delta_4$ is calculated as 3; and The sub-step 2045 is, if the first difference, the second difference, the third difference, and the fourth difference satisfy a preset condition, then it will be determined that the imaging direction of the current image of the mobile terminal is the target photo-taking direction; otherwise, it will be determined that the imaging direction of the current image of the mobile terminal is not the target photo-taking direction Here the preset condition is that the first difference is more than the second difference, and the third difference is more than the fourth difference.

Here if the first difference, the second difference, the third difference, and the fourth difference satisfy the preset condition, which indicates that the direction in which the user holds the mobile terminal in his or her hand agrees with the photo-taking direction detected by the mobile terminal, then it will be determined that the current photo-taking direction of the mobile terminal (i.e., the imaging direction of the image) is the intended target photo-taking direction of the user. if the first difference, the second difference, the third difference, and the fourth difference do not satisfy the preset condition, which indicates that the direction in which the user holds the mobile terminal in his or her hand does not agree with the photo-taking direction detected by the mobile terminal, then it will be determined that the current photo-taking direction of the mobile terminal (i.e., the imaging direction of the image) is not the intended target photo-taking direction of the user.

For example, in the example illustrated in FIG. 3-3, the user holds the mobile terminal in his or her hand in the landscape direction, that is, the user needs to take a photo in the photo-taking direction which is the landscape direction using the mobile terminal, and the intended target photo-taking direction of the user is the landscape direction, where as calculated from the coordinates of the first feature point A1, the coordinates of the second feature point B1, and the coordinates of the third feature point C1, the first difference $\Delta_1=5$ is more than the second difference $\Delta_2$ and the third difference $\Delta_3=15$ is more than the fourth difference $\Delta_4=3$, so it is determined that the current photo-taking direction of the back camera of the mobile terminal is the intended target photo-taking direction of the user, both of which are the landscape direction.

For example, as illustrated in FIG. 3-5, if the user holds the mobile terminal in his or her hand in the landscape direction with the top of the mobile terminal higher than the bottom thereof, so that the mobile terminal detects the photo-taking direction as the portrait direction, then the photo-taking direction indicator displayed by the mobile terminal will point to the photo-taking direction which is the portrait direction, and the arrow will point to such a side of the mobile terminal that is mistaken for the top of the mobile terminal, so that the mobile terminal newly creates a new coordinate system by mistaking the bottom-left corner Q2 of the screen of the mobile terminal for the top-left corner Q1 of the screen of the mobile terminal, and determining the current bottom-left corner Q2 as the origin of the new coordinate system with the x axis perpendicular to the user, and the y axis parallel to the user. However at that time, the mobile terminal is still held in the hand of the user, and placed in the landscape direction, and the human face image, taken by the front camera, displayed on the screen of the terminal is still in the landscape direction, but the coordinates of the first feature point A1, the second feature point B1, and the third feature point C1 are changed respectively to (5, 5), (5, 10), and (1, 7). The first difference $\Delta_1$, the second difference $\Delta_2$, the third difference $\Delta_3$, and the fourth difference $\Delta_4$ are calculated at this time as 0, 5, −3, and 4, so that the first difference is less than the second difference, and the third difference is less than the fourth difference, thus failing to satisfy the preset condition, so it can be determined that the current photo-taking direction of the front camera of the mobile terminal is not the intended target photo-taking direction of the user, that is, the imaging direction of the image is not the real photo-taking direction which is the landscape direction.

In another example, in the example illustrated in FIG. 3-4, the user holds the mobile terminal in his or her hand in the portrait direction, that is, the user needs to take a photo in the photo-taking direction which is the portrait direction using the mobile terminal, and the intended target photo-taking direction of the user is the portrait direction, where as calculated from the coordinates of the first feature point A2, the coordinates of the second feature point B2, and the coordinates of the third feature point C2, the first difference $\Delta_1=5$ is more than the second difference $\Delta_2=0$, and the third difference $\Delta_3=15$ is more than the fourth difference $\Delta_4=3$, so it is determined that the current photo-taking direction of the back camera of the mobile terminal is the intended target photo-taking direction of the user, both of which are the portrait direction, that is, the imaging direction of the image obtained by the back camera agrees with the real target photo-taking direction.

For example, as illustrated in FIG. 3-7, if the user holds the mobile terminal in his or her hand in the portrait direction with the left side of the mobile terminal higher than the right side thereof, or the right side of the mobile terminal higher than the left side thereof, so that the mobile terminal detects the photo-taking direction as the landscape direction, then the photo-taking direction indicator displayed by the mobile terminal will point to the photo-taking direction which is the landscape direction, and the arrow will point to such a side of the mobile terminal that is mistaken for the top of the mobile terminal, so that the mobile terminal newly creates a new coordinate system by mistaking the bottom-left corner Q3 of the screen of the mobile terminal for the top-left corner Q1 of the screen of the mobile terminal, and determining the current bottom-left corner Q3 as the origin of the new coordinate system with the x axis perpendicular to the user, and the y axis parallel to the user. However at that time, the mobile terminal is still held in the hand of the user, and placed in the portrait direction, and the human face image, taken by the front camera, displayed on the screen of the terminal is still in the portrait direction, but the coordinates of the first feature point A2, the second feature point B2, and the third feature point C2 are changed respectively to (3, 20), (10, 20), and (7, 7). The first difference $\Delta_1$, the second difference $\Delta_2$, the third difference $\Delta_3$, and the fourth difference $\Delta_4$ are calculated at this time as 7, 0, −3, and 3, so that the first difference is more than the second difference, and the third difference is less than the fourth difference, thus failing to satisfy the preset condition, so it can be determined that the current photo-taking direction of the front camera of the mobile terminal is not the intended target photo-taking direction of the user, that is, the imaging direction of the image obtained by the back camera does not agree with the real photo-taking direction which is the portrait direction.

The step 205 is to adjust the imaging direction of the image obtained by the back camera to the target photo-taking direction of the back camera in the event that it is determined that the imaging direction of the image obtained by the back camera does not agree with the target photo-taking direction of the back camera.

Particularly as illustrated in FIG. 3-7, the step 205 can include the following sub-steps:

The sub-step 2051 is to superimpose the human face image onto the image obtained by the back camera, where the superimposition operation can be performed at the backend of the mobile terminal, or the human face image can be superimposed onto the image, obtained by the back camera, previewed on the mobile terminal, and the image resulting from superimposition can be displayed;

As illustrated in FIG. 3-8, if the real target photo-taking direction of the user is the portrait direction, but the imaging direction formed by the mobile terminal on the image obtained by the back camera is the landscape direction, then the human face image of the user obtained by the front camera will be superimposed onto the image obtained by the back camera.

The step 2052 is to rotate the image resulting from superimposition by 90 degrees in a preset direction, and the flow jumps to the step 204 where the comparison relationship between the coordinates of the first feature point, the second feature point, and the third feature point in the rotated image resulting from superimposition is determined, and it is determined whether the imaging direction of the rotated image resulting from superimposition agrees with the target photo-taking direction, and if not, then flow will proceed to the step 2052 where the image resulting from superimposition is further rotated by 90 degrees in the preset direction, and the flow jumps to the step 204 until it is determined that the imaging direction of the rotated image resulting from superimposition agrees with the target photo-taking direction;

The preset direction can be the clockwise direction or the counterclockwise direction. Here taking the counterclockwise direction as an example, FIG. 3-9 illustrates a schematic diagram of the image resulting from superimposition illustrated in FIG. 3-8, which is rotated clockwise by 90 degrees.

After the image resulting from superimposition is rotated, the flow proceeds to the step 204 where it is determined whether the imaging direction of the rotated image agrees with the real target photo-taking direction of the user, and if so, then the flow will proceed to the step 2053; otherwise, the flow will firstly proceed to the step 204' where it is determined whether the image is an image resulting from superimposition, and if so, then the flow will proceed to the step 2052.

Here it can be determined whether the image is an image resulting from superimposition, using a counter, where the value of the counter can be initialized to 0, and after the step 204 is performed, the step 204' is performed where it is determined whether the value of the counter is 0, and if so, then the flow will proceed to the step 2051; otherwise, the flow will proceed to the step 2052. Stated otherwise, if that it is determined for the first time that the imaging direction of the image obtained by the back camera does not agree with the real photo-taking direction of the user, then it will be further determined that the value of the counter is 0, where the flow proceeds to the steps 2051 and 2052, and jumps again to the step 204; if it is determined again in the step 204 that they do not agree with each other, then the flow will proceed to the step 204' where it is determined that the value of the counter is not 0, where the flow proceeds to the step 2052, and jumps to the step 204; and if it is determined in the step 204 that they agree with each other, than the flow will proceed to the step 2053.

The step 2053 is to image separately the image obtained by the back camera when the imaging direction of the rotated image resulting from superimposition agrees with the target photo-taking direction.

In the embodiments of the disclosure, it can be determined according to the first feature point, the second feature point, and the third feature point whether the imaging direction of the image resulting from the current photo-taking direction of the mobile terminal agrees with the real target photo-taking direction of the user, and if not, then the imaging direction of the image obtained by the back camera will be adjusted to the real target photo-taking direction, so that the photo-taking direction of the mobile terminal caters to the demand of the user. Furthermore the target photo-taking direction is also the direction in which the photo is viewed by the user, so that the photo-taking direction of the mobile terminal also agrees with the viewing direction of the user.

Optionally this step can be performed in the following two sub-steps 3031 and 3032:

In the embodiments of the disclosure, it can be determined according to the first feature point, the second feature point, and the third feature point whether the imaging direction of the image resulting from the current photo-taking direction of the mobile terminal agrees with the target photo-taking direction of the user, and if not, then the current photo-taking direction of the mobile terminal will be adjusted to the target photo-taking direction, so that the photo-taking direction of the mobile terminal caters to the demand of the user. Furthermore the target photo-taking direction is also the direction in which the photo is viewed by the user, so that the photo-taking direction of the mobile terminal also agrees with the viewing direction of the user.

Referring to FIG. 4, an embodiment of the disclosure provides an apparatus 400 for adjusting a photo-taking direction, where the apparatus 400 includes:

A starting module 401 is configured to start a back camera of a mobile terminal, to enter a photo-taking mode, to determine that the mobile terminal is in a horizontal posture, and to start a front camera of the mobile terminal to obtain a human face image of a user;

An extracting module 402 is configured to extract a corresponding first feature point, a corresponding second feature point, and a corresponding third feature point respectively from a first human face organ, a second human face organ, and a third human face organ in the human face image, where the first feature point, the second feature point, and the third feature point are located respectively on the first human face organ, the second human face organ, and the third human face organ, and the first human face organ and the second human face organ are the left and right eyes respectively, or the first human face organ and the second human face organ are the left and right eyebrows respectively; and the third human face organ is the nose or the mouth; and An adjusting module 403 is configured to determine a comparison relationship between coordinates of the first feature point, the second feature point, and the third feature point, to determine whether an imaging direction of an image obtained by the back camera agrees with a target photo-taking direction of the back camera, according to the comparison relationship between the coordinates, and to adjust the imaging direction of the image obtained by the back camera to the target photo-taking direction of the back camera in the event that they do not agree with each other.

Optionally the adjusting module 403 includes:

A first determining unit is configured to determine whether the imaging direction of the image obtained by the back camera agrees with the target photo-taking direction of the back camera, according to the comparison relationship between the coordinates of the first feature point, the second feature point, and the third feature point; and An adjusting unit is configured to adjust the imaging direction of the image obtained by the back camera to the target photo-taking direction of the back camera in the event that the first determining unit determines that they agree with each other.

Optionally the first determining unit is configured to calculate a first difference between an abscissa of the second feature point, and an abscissa of the first feature point, a second difference between an ordinate of the second feature point, and an ordinate of the first feature point, a third difference between an ordinate of the third feature point, and the ordinate of the second feature point, and a fourth difference between an abscissa of the second feature point, and the abscissa of the third feature point; if the first difference is more than the second difference, and the third difference is more than the fourth difference, to determine that the imaging direction of the image obtained by the back camera agrees with the target photo-taking direction of the back camera; and if not, to superimpose the human face image onto the image obtained by the back camera, to rotate an image resulting from the superimposition by 90 degrees in a preset direction, to determine the comparison relationship between the coordinates of the first feature point, the second feature point, and the third feature point in the rotated image resulting from the superimposition, to determine whether an imaging direction of rotated image resulting from the superimposition agrees with the target photo-taking direction, and if not, to further rotate the photo-taking direction by 90 degrees in the preset direction until the imaging direction of rotated image resulting from the superimposition agrees with the target photo-taking direction; and to image separately the image obtained by the back camera when the imaging direction of rotated image resulting from the superimposition agrees with the target photo-taking direction.

Optionally the first feature point, the second feature point, and the third feature point are central points on the first human face organ, the second human face organ, and the third human face organ.

Optionally the starting module 401 includes:

An obtaining unit is configured to obtain posture information of the mobile terminal, and to determine an angle between the mobile terminal and the horizontal plane according to the posture information, before the front camera of the mobile terminal is started, and the human face image of the user is obtained; and A second determining unit is configured to determine that the mobile terminal operates in a landscape photo-taking mode, when the angle is below a preset threshold.

In the embodiments of the disclosure, it can be determined according to the first feature point, the second feature point, and the third feature point whether the imaging direction of the image resulting from the current photo-taking direction of the back camera of the mobile terminal is the target photo-taking direction of the user, and if not, then the imaging direction of the image obtained by the back camera of the mobile terminal will be adjusted to the target photo-taking direction, so that the photo-taking direction of the mobile terminal caters to the demand of the user. Furthermore the target photo-taking direction is also the direction in which the photo is viewed by the user, so that the photo-taking direction of the mobile terminal also agrees with the viewing direction of the user.

FIG. 5 illustrates an apparatus for adjusting a photo-taking direction according to an embodiment of the disclosure, where the apparatus includes:

A memory 501 is configured to store at least one machine readable program code; and A processor 502 is configured to execute the at least one machine readable program code: to start a back camera of a mobile terminal, to enter a photo-taking mode, to determine that the mobile terminal is in a horizontal posture, and to start a front camera of the mobile terminal to obtain a human face image of a user;

To extract a corresponding first feature point, a corresponding second feature point, and a corresponding third feature point respectively from a first human face organ, a second human face organ, and a third human face organ in the human face image; and To determine a comparison relationship between coordinates of the first feature point, the second feature point, and the third feature point, to determine whether an imaging direction of an image obtained by the back camera agrees with a target photo-taking direction of the back camera, according to the comparison relationship between the coordinates, and to adjust the imaging direction of the image obtained by the back camera to the target photo-taking direction of the back camera in the event that they do not agree with each other.

Particularly the memory 501 can be the memory 103 of the mobile terminal 100 as illustrated in FIG. 1-9, and the processor 502 can be the processor 102 of the mobile terminal 100 as illustrated in FIG. 1-9, so that they can perform the corresponding functions of the memory 103 and the processor 102 respectively.

In the embodiments of the disclosure, it can be determined according to the first feature point, the second feature point, and the third feature point whether the imaging direction of the image resulting from the current photo-taking direction of the back camera of the mobile terminal is the target photo-taking direction of the user, and if not, then the imaging direction of the image obtained by the back camera of the mobile terminal will be adjusted to the target photo-taking direction, so that the photo-taking direction of the mobile terminal caters to the demand of the user. Furthermore the target photo-taking direction is also the direction in which the photo is viewed by the user, so that the photo-taking direction of the mobile terminal also agrees with the viewing direction of the user.

It shall be noted that the apparatus for adjusting a photo-taking direction according to the embodiments above has been described merely by way of an example in which the apparatus is divided into the respective functional modules, but in a real application, the functions above can be allocated as needed to different functional modules for performance, that is, the internal structure of the apparatus can be divided into different functional modules to perform all or a part of the functions described above. Furthermore the apparatus for adjusting a photo-taking direction according to the embodiments above shall fall into the same inventive idea as the method above for adjusting a photo-taking direction, and reference can be made to the embodiments of the disclosure for a particular implementation of the apparatus, so a repeated description thereof will be omitted here.

The embodiments above of the disclosure have been numbered only for the sake of a convenient description without suggesting any superiority or inferiority of one embodiment to another embodiment.

Those ordinarily skilled in the art can appreciate that all or a part of the steps in the methods according to the embodiments described above can be performed in hardware or in program instructing relevant hardware, where the program can be stored in a computer readable storage medium, which can be a Read-Only Memory (ROM), a magnetic disc, an optical disk, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for adjusting a photo-taking direction, the method comprising:
    starting a back camera of a mobile terminal, and entering a photo-taking mode;
    determining that the mobile terminal is in a horizontal posture, and starting a front camera of the mobile terminal to obtain a human face image of a user;
    extracting a corresponding first feature point, a corresponding second feature point, and a corresponding third feature point respectively from a first human face organ, a second human face organ, and a third human face organ in the human face image; and
    determining a comparison relationship between coordinates of the first feature point, the second feature point, and the third feature point, determining whether an imaging direction of an image obtained by the back camera agrees with a target photo-taking direction of the back camera, according to the comparison relationship between the coordinates, and adjusting the imaging direction of the image obtained by the back camera to the target photo-taking direction of the back camera in the event that they do not agree with each other.

2. The method according to claim 1, wherein the first human face organ and the second human face organ are the left and right eyes respectively, or the first human face organ and the second human face organ are the left and right eyebrows respectively; and
    the third human face organ is the nose or the mouth.

3. The method according to claim 2, wherein determining the comparison relationship between the coordinates of the first feature point, the second feature point, and the third feature point, and determining whether the imaging direction of the image obtained by the back camera agrees with the target photo-taking direction of the back camera, according to the comparison relationship between the coordinates comprises:
    calculating a first difference between an abscissa of the second feature point, and an abscissa of the first feature point, a second difference between an ordinate of the second feature point, and an ordinate of the first feature point, a third difference between an ordinate of the third feature point, and the ordinate of the second feature point, and a fourth difference between an abscissa of the second feature point, and the abscissa of the third feature point; and
    if the first difference is more than the second difference, and the third difference is more than the fourth difference, then determining that the imaging direction of the image obtained by the back camera agrees with the target photo-taking direction of the back camera.

4. The method according to claim 3, wherein adjusting the imaging direction of the image obtained by the back camera to the target photo-taking direction of the back camera comprises:
    superimposing the human face image onto the image obtained by the back camera;
    rotating an image resulting from the superimposition by 90 degrees in a preset direction, determining the comparison relationship between the coordinates of the first feature point, the second feature point, and the third feature point in the rotated image resulting from the superimposition, determining whether an imaging direction of rotated image resulting from the superimposition agrees with the target photo-taking direction, and if not, then further rotating the photo-taking direction by 90 degrees in the preset direction until the imaging direction of rotated image resulting from the superimposition agrees with the target photo-taking direction; and
    imaging separately the image obtained by the back camera when the imaging direction of rotated image resulting from the superimposition agrees with the target photo-taking direction.

5. The method according to claim 1, wherein the first feature point, the second feature point, and the third feature point respectively are central points on the first human face organ, the second human face organ, and the third human face organ.

6. The method according to claim 1, wherein determining that the mobile terminal is in the horizontal posture comprises:
    obtaining posture information of the mobile terminal; and
    determining an angle between the mobile terminal and the horizontal plane according to the posture information, and if the angle is below a preset threshold, then determining that the mobile terminal is in the horizontal posture.

7. An apparatus for adjusting a photo-taking direction, the apparatus comprising:

a memory configured to store at least one machine readable program code; and a processor configured to execute the at least one machine readable program code to perform:

starting a back camera of a mobile terminal, and entering a photo-taking mode;

determining that the mobile terminal is in a horizontal posture, and starting a front camera of the mobile terminal to obtain a human face image of a user;

extracting a corresponding first feature point, a corresponding second feature point, and a corresponding third feature point respectively from a first human face organ, a second human face organ, and a third human face organ in the human face image; and determining a comparison relationship between coordinates of the first feature point, the second feature point, and the third feature point, determining whether an imaging direction of an image obtained by the back camera agrees with a target photo-taking direction of the back camera, according to the comparison relationship between the coordinates, and adjusting the imaging direction of the image obtained by the back camera to the target photo-taking direction of the back camera in the event that they do not agree with each other.

8. The apparatus according to claim 7, wherein the first human face organ and the second human face organ are the left and right eyes respectively, or the first human face organ and the second human face organ are the left and right eyebrows respectively; and the third human face organ is the nose or the mouth; and the processor executing the at least one machine readable program code to perform determining the comparison relationship between the coordinates of the first feature point, the second feature point, and the third feature point, and determining whether the imaging direction of the image obtained by the back camera agrees with the target photo-taking direction of the back camera, according to the comparison relationship between the coordinates comprises:

calculating a first difference between an abscissa of the second feature point, and an abscissa of the first feature point, a second difference between an ordinate of the second feature point, and an ordinate of the first feature point, a third difference between an ordinate of the third feature point, and the ordinate of the second feature point, and a fourth difference between an abscissa of the second feature point, and the abscissa of the third feature point; and if the first difference is more than the second difference, and the third difference is more than the fourth difference, then determining that the imaging direction of the image obtained by the back camera agrees with the target photo-taking direction of the back camera.

9. The apparatus according to claim 8, wherein the processor executing the at least one machine readable program code to perform adjusting the imaging direction of the image obtained by the back camera to the target phototaking direction of the back camera comprises:

superimposing the human face image onto the image obtained by the back camera;

rotating an image resulting from the superimposition by 90 degrees in a preset direction, determining the comparison relationship between the coordinates of the first feature point, the second feature point, and the third feature point in the rotated image resulting from the superimposition, determining whether an imaging direction of rotated image resulting from the superimposition agrees with the target photo-taking direction, and if not, then further rotating the photo-taking direction by 90 degrees in the preset direction until the imaging direction of rotated image resulting from the superimposition agrees with the target photo-taking direction; and imaging separately the image obtained by the back camera when the imaging direction of rotated image resulting from the superimposition agrees with the target photo-taking direction.

10. The apparatus according to claim 7, wherein the processor executing the at least one machine readable program code to perform determining that the mobile terminal is in the horizontal posture comprises:

obtaining posture information of the mobile terminal; and determining an angle between the mobile terminal and the horizontal plane according to the posture information, and if the angle is below a preset threshold, then determining that the mobile terminal is in the horizontal posture.

11. A mobile terminal, comprising a front camera, a back camera, a memory, and a processor, wherein:

the memory is configured to store at least one machine readable program code; and the processor is configured to execute the at least one machine readable program code to perform: starting a back camera of a mobile terminal, and entering a photo-taking mode; determining that the mobile terminal is in a horizontal posture, and starting a front camera of the mobile terminal to obtain a human face image of a user; extracting a corresponding first feature point, a corresponding second feature point, and a corresponding third feature point respectively from a first human face organ, a second human face organ, and a third human face organ in the human face image; and determining a comparison relationship between coordinates of the first feature point, the second feature point, and the third feature point, determining whether an imaging direction of an image obtained by the back camera agrees with a target photo-taking direction of the back camera, according to the comparison relationship between the coordinates, and adjusting the imaging direction of the image obtained by the back camera to the target photo-taking direction of the back camera in the event that they do not agree with each other.

12. The mobile terminal according to claim 11, wherein the first human face organ and the second human face organ are the left and right eyes respectively, or the first human face organ and the second human face organ are the left and right eyebrows respectively; and the third human face organ is the nose or the mouth; and the processor executing the at least one machine readable program code to perform determining the comparison relationship between the coordinates of the first feature point, the second feature point, and the third feature point, and determining whether the imaging direction of the image obtained by the back camera agrees with the target photo-taking direction of the back camera, according to the comparison relationship between the coordinates comprises:

calculating a first difference between an abscissa of the second feature point, and an abscissa of the first feature point, a second difference between an ordinate of the second feature point, and an ordinate of the first feature point, a third difference between an ordinate of the third feature point, and the ordinate of the second feature point, and a fourth difference between an abscissa of the second feature point, and the abscissa of the third feature point; and if the first difference is more than the second difference, and the third difference is more than the fourth difference, then determining that the imaging direction of the image obtained by the back camera agrees with the target photo-taking direction of the back camera.

13. The mobile terminal according to claim 12, wherein the processor executing the at least one machine readable program code to perform adjusting the imaging direction of the image obtained by the back camera to the target photo-taking direction of the back camera comprises:

superimposing the human face image onto the image obtained by the back camera;

rotating an image resulting from the superimposition by 90 degrees in a preset direction, determining the comparison relationship between the coordinates of the first feature point, the second feature point, and the third feature point in the rotated image resulting from the superimposition, determining whether an imaging direction of rotated image resulting from the superimposition agrees with the target photo-taking direction, and if not, then further rotating the photo-taking direction by 90 degrees in the preset direction until the imaging direction of rotated image resulting from the superimposition agrees with the target photo-taking direction; and imaging separately the image obtained by the back camera when the imaging direction of rotated image resulting from the superimposition agrees with the target photo-taking direction.

14. The mobile terminal according to claim 11, wherein the processor executing the at least one machine readable program code to perform determining that the mobile terminal is in the horizontal posture comprises:

obtaining posture information of the mobile terminal; and determining an angle between the mobile terminal and the horizontal plane according to the posture information, and if the angle is below a preset threshold, then determining that the mobile terminal is in the horizontal posture.

* * * * *